US 6,739,486 B2

(12) United States Patent
Winkler

(10) Patent No.: US 6,739,486 B2
(45) Date of Patent: May 25, 2004

(54) DISPENSER FOR DISPENSING FILL MATERIAL INTO A GOLF COURSE DIVOT HOLE AND A METHOD AND APPARATUS FOR MOUNTING A DISPENSER TO A GOLF CART

(75) Inventor: David R. Winkler, Pacific, MO (US)

(73) Assignee: Covered Solutions, Inc., Pacific, MO (US)

( * ) Notice: Subject to any disclaimer, the term of this patent is extended or adjusted under 35 U.S.C. 154(b) by 100 days.

(21) Appl. No.: 10/034,141

(22) Filed: Dec. 28, 2001

(65) Prior Publication Data
US 2002/0056728 A1 May 16, 2002

Related U.S. Application Data

(63) Continuation-in-part of application No. 29/150,653, filed on Nov. 26, 2001, now Pat. No. Des. 463,226, which is a continuation-in-part of application No. 09/957,199, filed on Sep. 20, 2001, which is a continuation-in-part of application No. 09/827,327, filed on Apr. 5, 2001, now Pat. No. 6,601,904, which is a continuation-in-part of application No. 09/634,437, filed on Aug. 8, 2000, now Pat. No. 6,220,647.

(51) Int. Cl.[7] .................................................. B67D 5/64
(52) U.S. Cl. ........................ 222/608; 222/183; 224/274
(58) Field of Search ................................ 222/608, 183; 224/274

(56) References Cited

U.S. PATENT DOCUMENTS

| 36,095 A | 8/1862 | Keene ......................... 222/460 |
| 208,564 A | 10/1878 | Bowers |
| 615,171 A | 11/1898 | Hersberger ................. 222/498 |
| 1,470,630 A | 10/1923 | Mahr |
| 1,492,090 A | 4/1924 | Van Tine ..................... 222/542 |
| 2,017,319 A | 10/1935 | McMullen ............... 248/312.1 |
| 2,078,497 A | 4/1937 | Johnston ..................... 222/462 |

(List continued on next page.)

FOREIGN PATENT DOCUMENTS

| DE | 3517967 A1 | 11/1985 | |
| EP | 58208 A | 8/1982 | ............ 222/189.02 |

OTHER PUBLICATIONS

2002/0041106–A1, Winkler, Published Apr. 11, 2002.
2002/0027373 A1, Winker, Published Mar. 07, 2002.
2002/0033402–A1, Winkler, Publshed Mar. 21, 2002.

Primary Examiner—Philippe Derakshani
(74) Attorney, Agent, or Firm—Thompson Coburn, LLP

(57) ABSTRACT

A dispenser is provided for holding and dispensing a fill material into a divot hole on a golf course. The dispenser has a container, a spout releasably attached to an end of the container and dispersing means for dispersing the fill material within an interior of the dispenser. A holder for dispenser is provided with protrusions that engage the dispenser in a manner where the dispenser is spaced the holder. The holder is provided with a universal mounting surface that permits attaching the holder to a golf car in a variety of positions. A mounting plate for the holder and brackets are also provided.

33 Claims, 8 Drawing Sheets

U.S. PATENT DOCUMENTS

| | | | | |
|---|---|---|---|---|
| 2,650,743 | A | 9/1953 | Floyd | 222/210 |
| 2,663,464 | A | 12/1953 | Lahonen | 222/360 |
| 2,689,579 | A | 9/1954 | Sartori | |
| 3,671,071 | A | 6/1972 | Evinrude | |
| 4,008,874 | A | 2/1977 | Conway, Jr. | |
| 4,013,315 | A | 3/1977 | West | |
| 4,037,614 | A | 7/1977 | Hines et al. | |
| 4,098,536 | A | 7/1978 | Mills | |
| 4,153,089 | A | 5/1979 | Veilleux | 150/7 |
| 4,469,114 | A | 9/1984 | Kelley et al. | |
| 4,641,879 | A | 2/1987 | Kassai | |
| 4,715,138 | A | 12/1987 | Cherico | |
| 4,773,175 | A | 9/1988 | Larsen | |
| 4,830,037 | A | 5/1989 | Held | |
| 4,846,524 | A | 7/1989 | Gerber | |
| 5,010,941 | A | 4/1991 | Ross, Sr. et al. | |
| 5,058,943 | A | 10/1991 | Louderback | |
| 5,069,481 | A | 12/1991 | Strange | |
| 5,072,987 | A | 12/1991 | Allen | |
| 5,101,744 | A | 4/1992 | Nolan | 111/95 |
| 5,131,570 | A * | 7/1992 | Sawyer, III | 222/175 |
| 5,146,967 | A | 9/1992 | Chapman | |
| 5,184,865 | A | 2/1993 | Mohtasham et al. | |
| 5,190,340 | A | 3/1993 | Nuscher | |
| 5,310,235 | A | 5/1994 | Seymour et al. | |
| 5,437,335 | A * | 8/1995 | Hines, Sr. | 172/22 |
| 5,484,128 | A | 1/1996 | Franco, Sr. | 248/11.2 |
| 5,551,745 | A | 9/1996 | Huang | |
| 5,588,690 | A | 12/1996 | Showalter | |
| 5,688,018 | A | 11/1997 | Simpson | |
| 5,709,321 | A * | 1/1998 | Smrt | 222/181.3 |
| 5,741,041 | A | 4/1998 | Sullivan | |
| 5,898,962 | A | 5/1999 | McNeal | |
| 5,996,863 | A | 12/1999 | Burke | |
| 6,007,134 | A | 12/1999 | Weston | |
| 6,068,325 | A | 5/2000 | Hughes | |
| 6,216,714 | B1 | 4/2001 | Tucker | |
| 6,220,647 | B1 | 4/2001 | Winkler | |
| 6,227,217 | B1 | 5/2001 | Peta | |
| 6,227,603 | B1 | 5/2001 | Brock | |
| 6,267,269 | B1 | 7/2001 | Kates | 222/162 |
| 6,367,181 | B1 | 4/2002 | Skoog | |
| D463,225 | S | 9/2002 | Winkler | |
| D463,226 | S | 9/2002 | Winkler | |
| 6,450,268 | B1 | 9/2002 | Taylor | 172/354 |

* cited by examiner

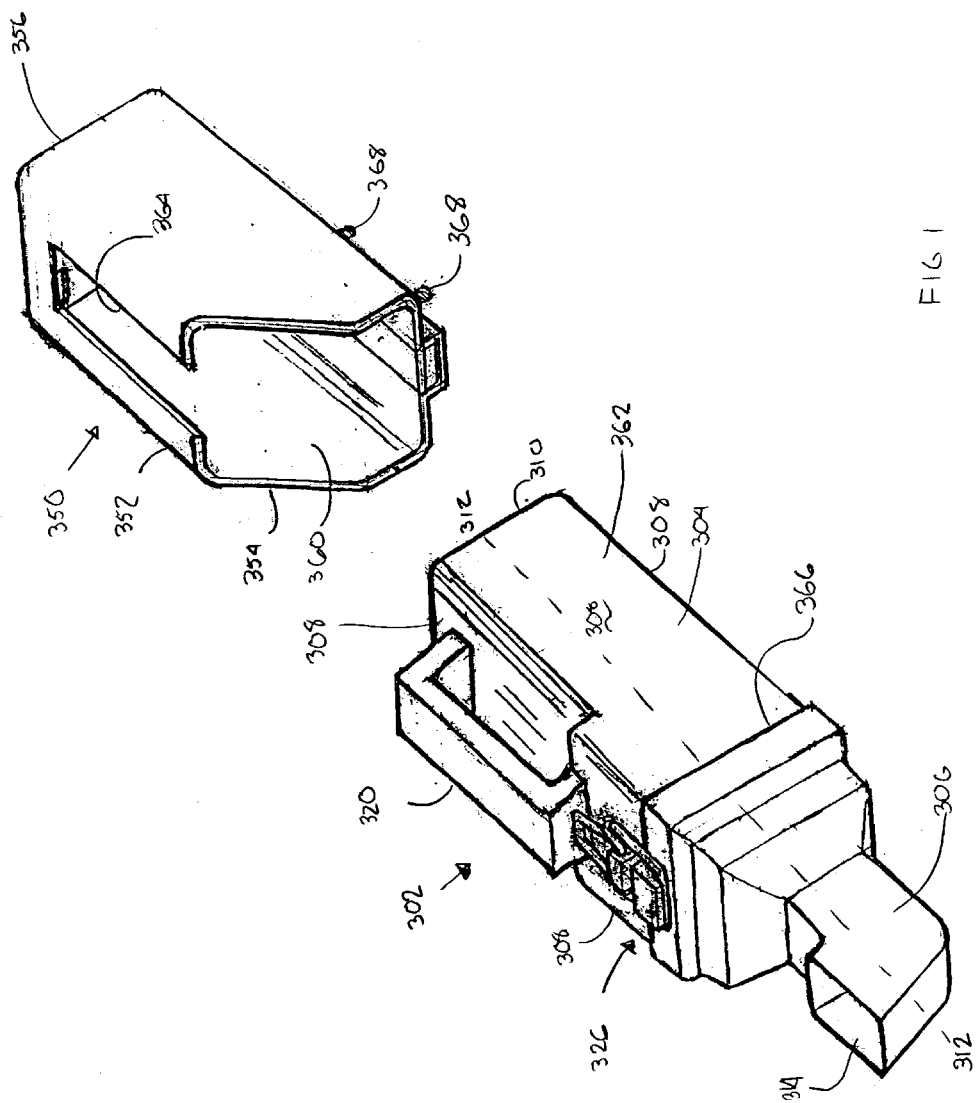

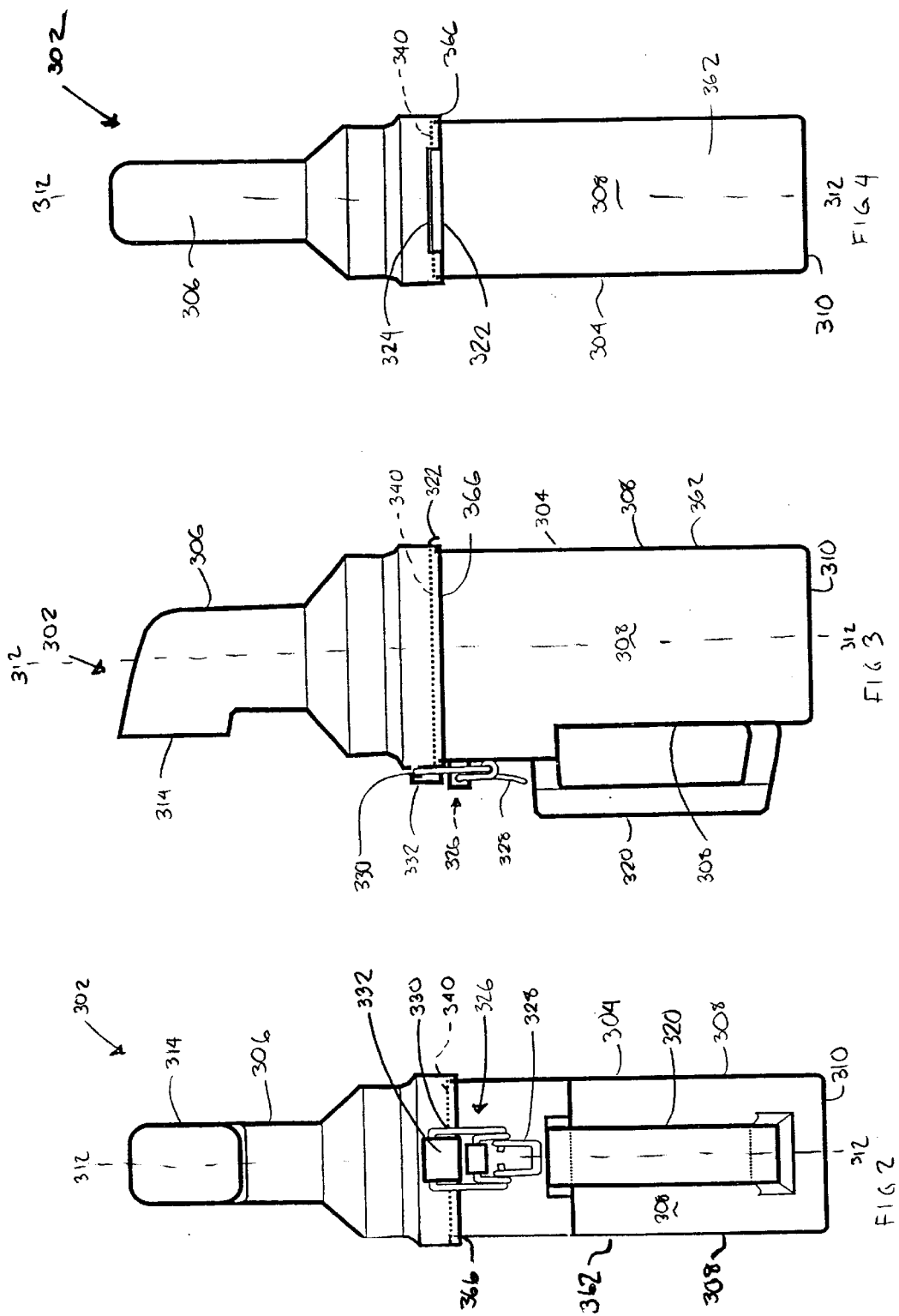

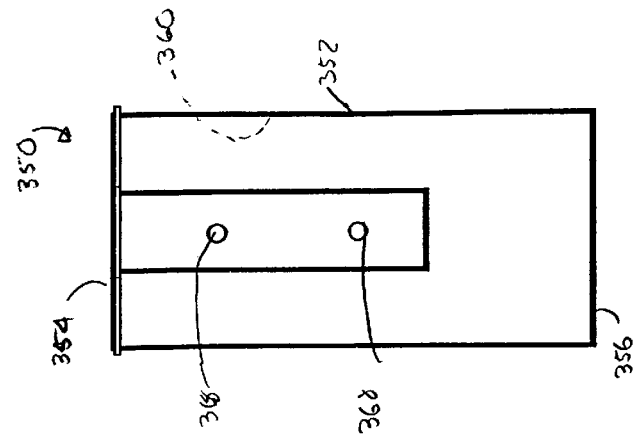
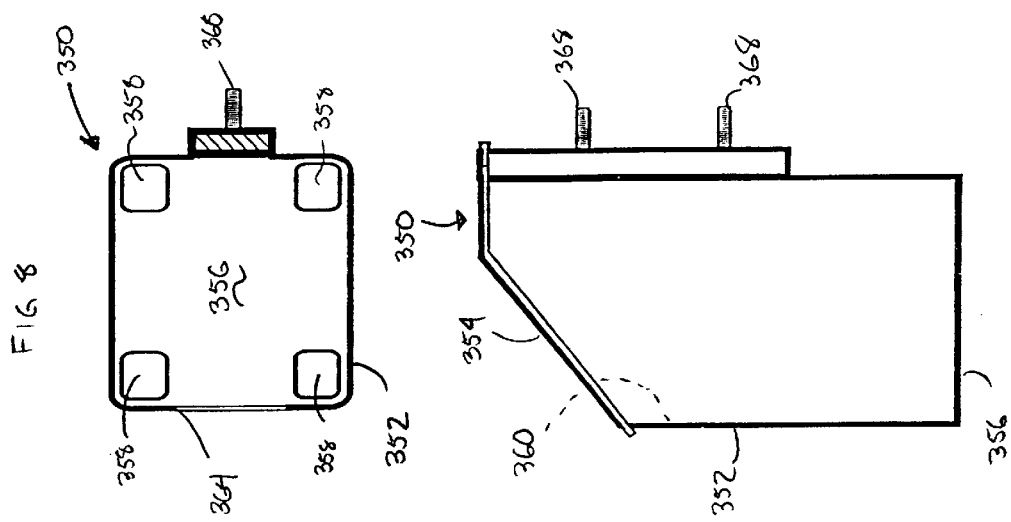
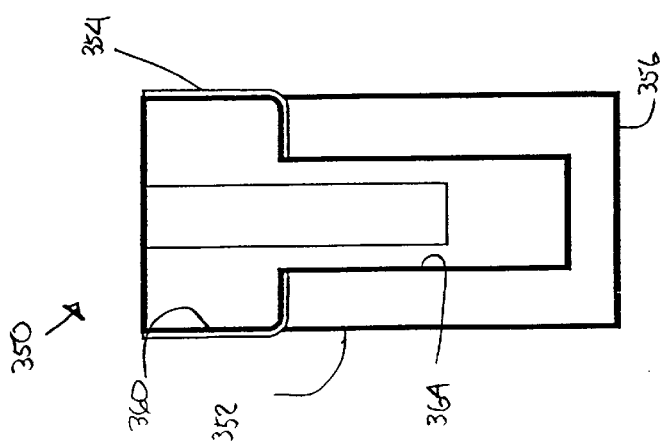

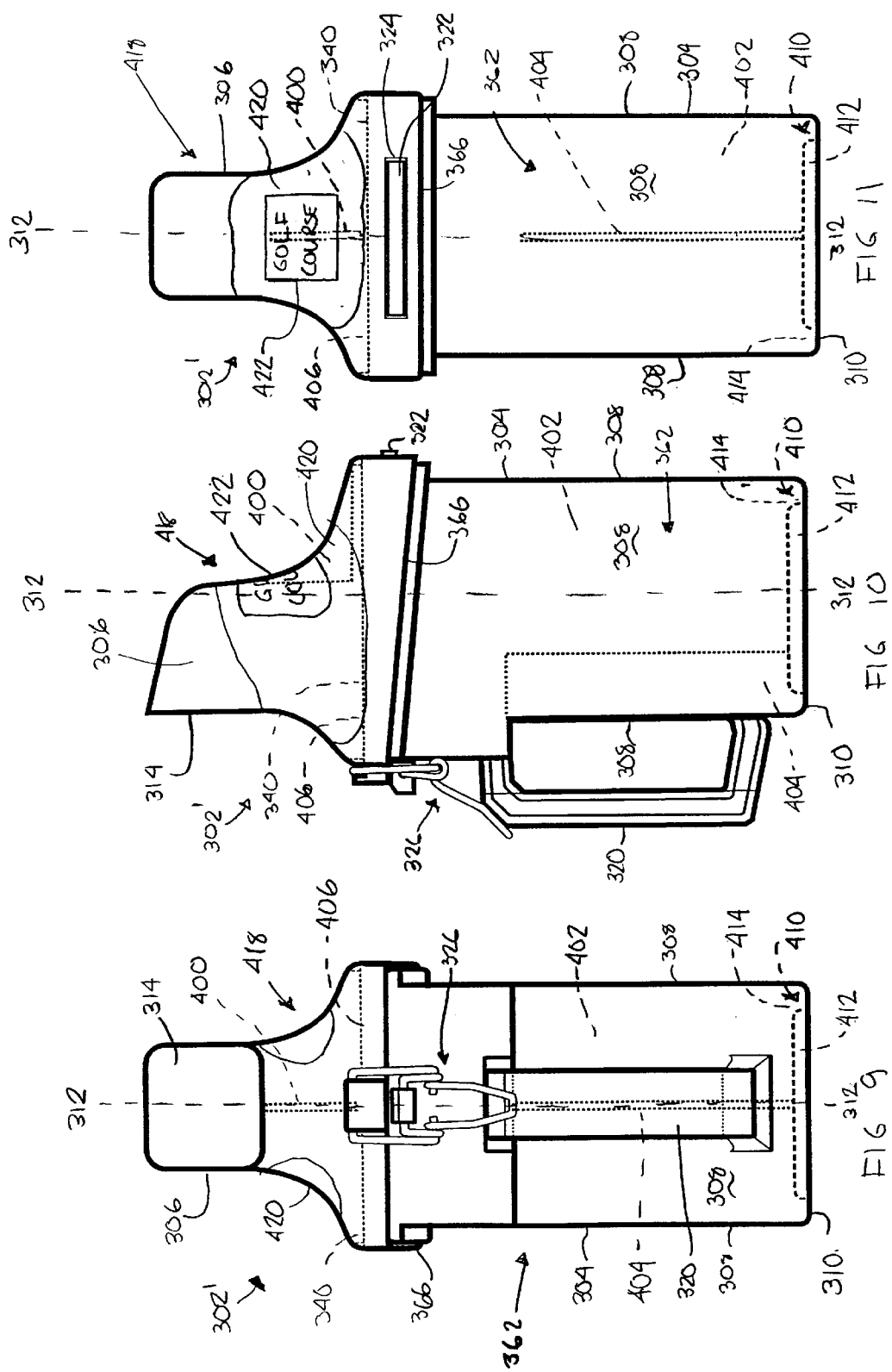

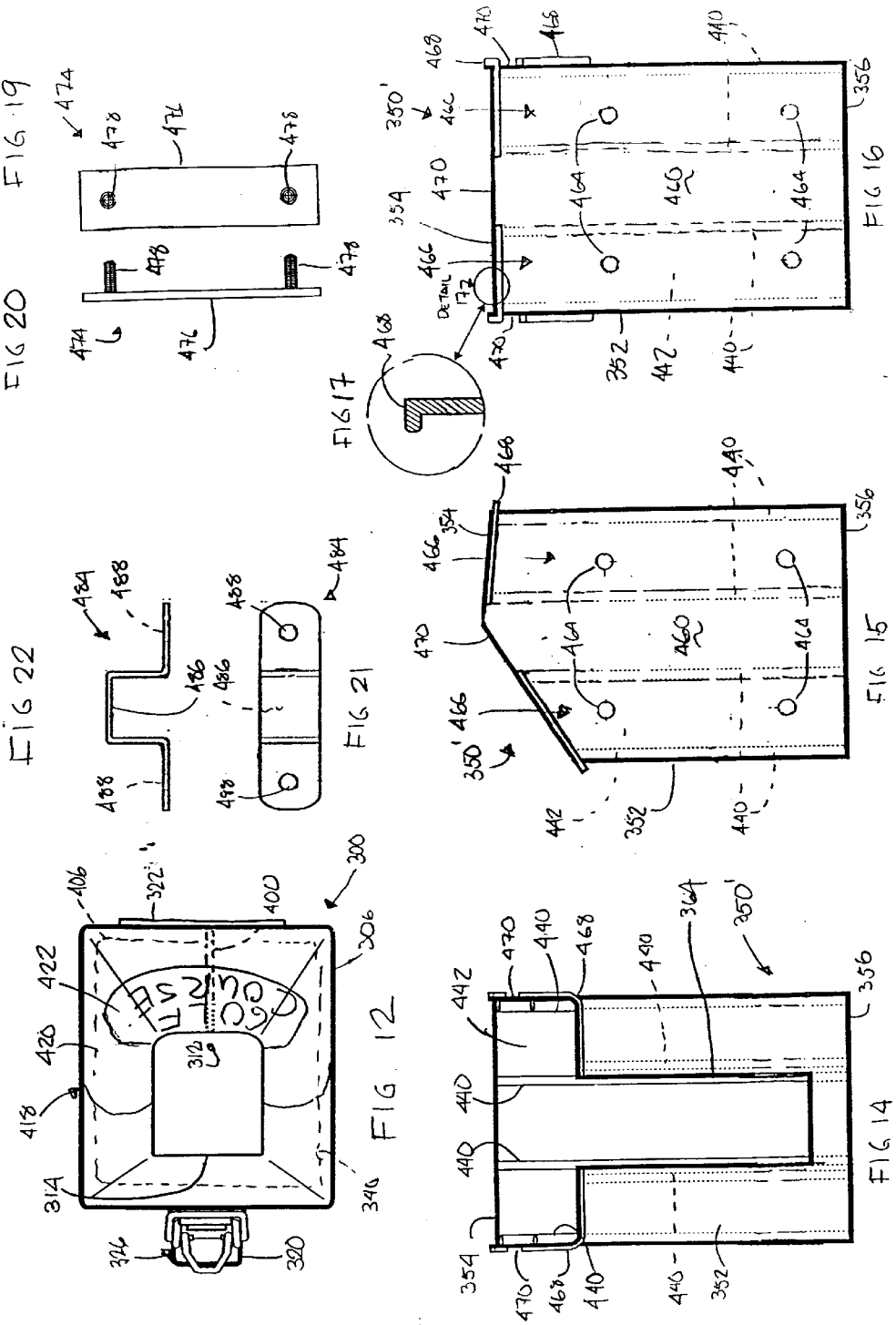

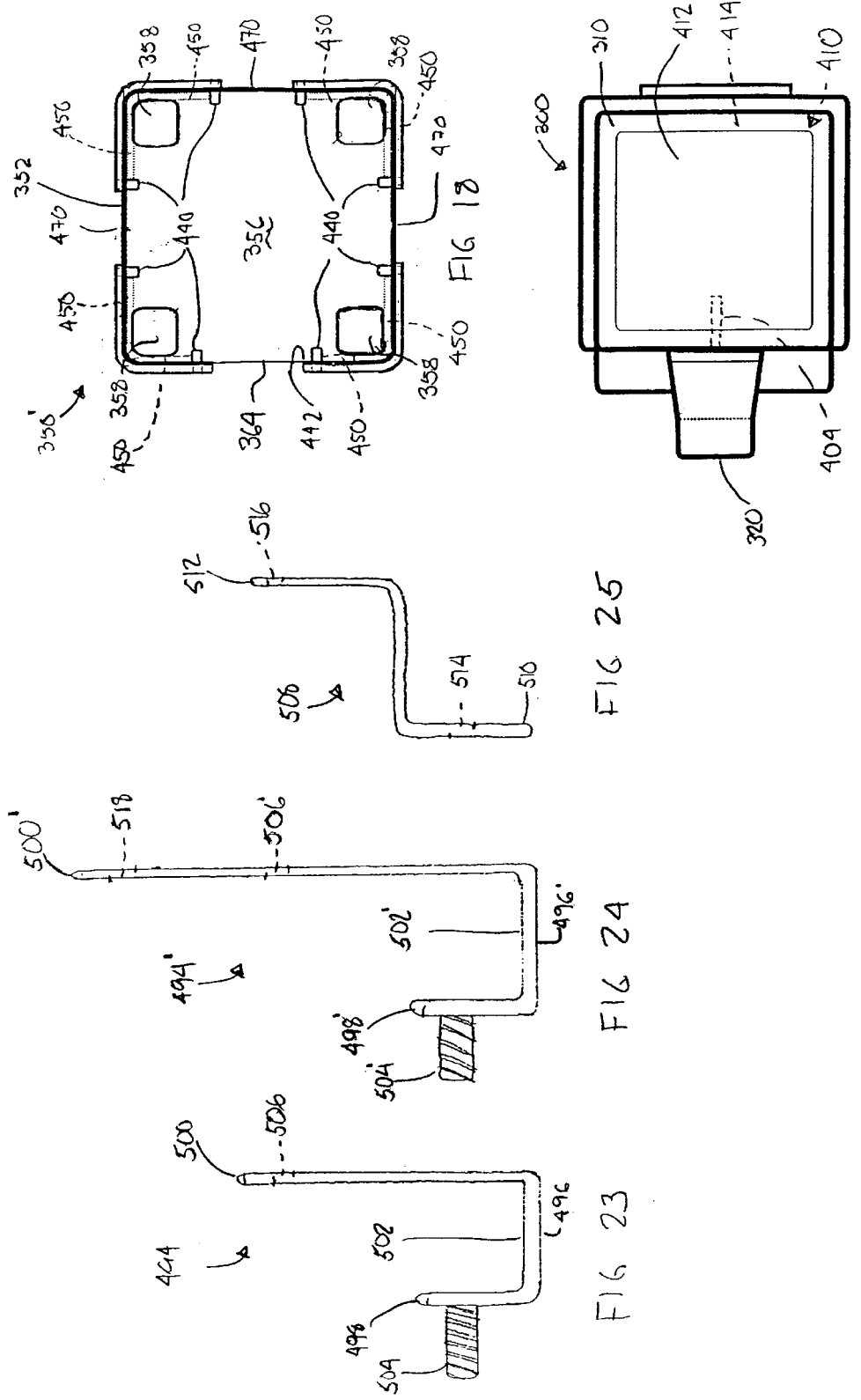

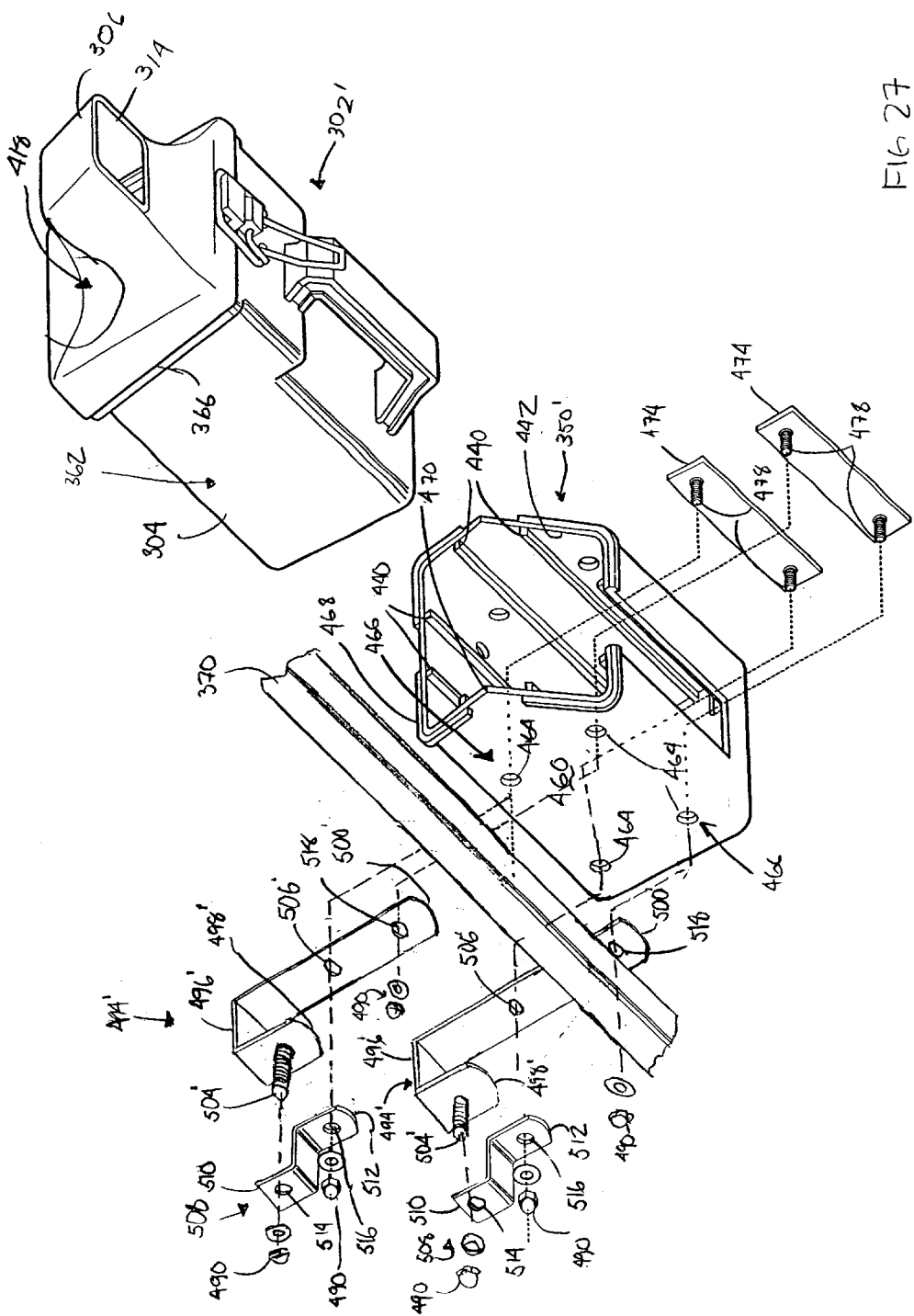

DISPENSER FOR DISPENSING FILL MATERIAL INTO A GOLF COURSE DIVOT HOLE AND A METHOD AND APPARATUS FOR MOUNTING A DISPENSER TO A GOLF CART

RELATED APPLICATION DATA

This application is a continuation-in-part of application Ser. No. 29/150,653, filed Nov. 26, 2001, now U.S. Pat. No. D4633226, which is a continuation-in-part of application Ser. No. 09/957,199, filed Sep. 20, 2001, currently pending, which is a continuation-in-part of 09/827,327, filed Apr. 5, 2001, now U.S. Pat. No. 6,601,904, which is a continuation-in-part of application Ser. No. 09/634,437, filed Aug. 8, 2000, now U.S. Pat. No. 6,220,647, issued Apr. 24, 2001, the disclosures of which are hereby incorporated by reference.

BACKGROUND OF THE INVENTION

The invention pertains to a dispenser for dispensing a fill material into a divot hole on a golf course. More specifically, the invention pertains to an improvement to the dispenser and its method of use as well as an improvement to a method of mounting it to a golf car.

In golfing, it is common to create a divot when hitting a golf ball with a golf club. In order to create loft, the club face is directed into the ground under the golf ball. Consequently, the club creates a small depression or divot hole in the ground and the contents of the hole or the divot are projected outward in the same general direction as the golf ball. Depending on the type of grass used on the golf course fairway and rough, most divots formed are intact sections of grass and sod that can be directly replaced into the divot hole. Once the divot is returned to the divot hole and some pressure applied to the divot, the grass/sod section will more often than not take root again. By replacing divots, the overall condition of the golf course may be maintained. Generally, golf course rules require that golfers replace their divots. Also, under the time-honored customs of the golf game, the golfer has a duty to replace a divot after taking such a shot.

However, some golf courses utilize different types of grasses that do not form generally intact divots. Consequently, when a golfer takes his shot and a divot is formed, the divot may disintegrate where it cannot be returned directly to the divot hole. Examples of these kinds of grasses include a bent-type or Bermuda-type grass. Thus, for courses using these grasses, a divot mix dispenser is provided to the golfer for repairing divot holes. These dispensers dispense a mixture of sand, soil, fertilizer, grass seed and colorant in selected proportions prepared as appropriate for the golf course grass and soil type to optimally start new grass growth in the divot hole.

A conventional divot mix dispenser generally comprises a container similar to a round jar with a funnel-like pouring spout that is screwed onto the container. An opening of the spout is in line with the container and faces generally upwardly when the container is rested vertically on its bottom. When using the dispenser, the dispenser is tilted to allow the divot mix to be poured from the spout. When the dispenser needs to be refilled with the divot mix, the spout is unscrewed from the container, the mix is poured into the container and the spout is screwed back on the container.

The divot mix dispensers of the prior art have many disadvantages. Generally, they are not provided with any handles or other grip-type devices and the size of the dispenser requires that the golfer use two hands around the container to pour out the divot mix. Considering that the golfer has just taken a shot and is holding a golf club and/or ball and/or tee, using two hands to pour the mix is very cumbersome.

Additionally, the conventional divot mix dispensers are not easily transportable around a golf course. As a golfer will generally create divots in different locations on the golf course, for the dispenser to be effectively used, the dispenser must move with the golfer as the golfer travels along the course. The conventional dispenser is typically stored in a basket (the "sweater basket") located to the rear of the passenger compartment behind the seats of the golf car where it is not readily accessible to a golfer. Also, as the dispenser is generally cylindrical in shape, the dispenser tends to roll and bounce around as the golf car is operated along the generally hilly and bumpy terrain of the golf course. Because the divot mix dispenser is often loosely carried in a basket on the golf cart, the undesired agitation and vibration tends to cause the fill material to undesirably spill from the dispenser.

Additionally, the spout of the conventional dispenser generally has its opening aligned with a center line container when the spout is screwed on the container. Thus, when the dispenser is positioned vertically upright, rain or water from sprinklers can easily enter the hole and the inside of the container, consequently causing the fill material to solidify in the container. This obviously makes it difficult if not impossible to pour the mix out of the dispenser. Also, it is often difficult to meter the proper amount of divot mix into the divot hole with the spout opening directly in line with the container.

As noted above, the conventional dispenser generally has a screw threaded connection between the spout and the container. Thus, if the threads are not wiped clean after filling the container, the spout will often times not properly screw back onto the container, and as the divot mix is abrasive, the threads may be damaged, thereby rendering the container unusable. This detail is often overlooked and can result in premature failure of many of these dispensers.

In application Ser. No. 09/957,199, Applicant disclosed a dispenser for holding and dispensing a fill material into a divot hole on a golf course having several advantages over those found in the prior art. The dispenser comprises a container and a spout releasably attached to an end of the container having a rainproof opening. The inventor has continued his work on the dispenser and invented several improvements, the disclosure of which follows below.

SUMMARY OF THE INVENTION

Among the provisions of the present invention is that of a dispenser for holding and dispensing a fill material into a divot hole on a golf course. The dispenser includes a container and a spout releasably attached to an end of the container having an opening offset from a centerline of the container through which the fill material flows out of the dispenser. The dispenser also includes a baffle integrally formed with the dispenser in an interior of the dispenser for dispersing the fill material contained within the dispenser when the dispenser is shaken. The baffle may include upper and lower baffles formed on opposite interior walls in the dispenser interior against which the fill material impacts when the dispenser is shaken.

In another aspect of the present invention, the dispenser is provided with an indicia area on its exterior surface and a desired indicia is displayed on the indicia area where it is visible from a top and sides of the dispenser. The desired indicia may include commercial advertising, personalized information or golf course information. Among the aspects of the present invention is the provision of a method for doing the same.

Another aspect of the present invention includes a holder for the dispenser. The holder is adapted to attach to a structure of a golf car and comprises a sleeve with protrusions spaced about its interior surface. The sleeve preferably has an open top with a closed bottom and the dispenser is slidingly received in the sleeve interior through the open top. Preferably, the protrusions are vertical rib members extending from the sleeve top to the sleeve bottom that engage with the dispenser exterior surface in a manner to create a space between the dispenser exterior surface and the sleeve interior surface when the dispenser is slidingly received in the holder.

In another aspect of the present invention, the holder sleeve has a mounting surface on its exterior surface adapted to permit mounting the holder to the golf car support post in one of a variety of selected positions of the holder relative to the support post without alteration of the sleeve mounting surface or support post. The mounting surface may include a plurality of holes arranged in various patterns that allow the holder to mounted in various positions relative to the golf car support post. Mechanical fasteners may be directed through any of the holes to allow operably attaching the holder to the golf car support post in any number convenient orientations as desired by the user. Preferably, the sleeve has a rectangular cross section and the hole patterns are arranged on the faces of the sleeve to allow the sleeve to be mounted to the left, right or in front of the golf cart support, as desired.

Another aspect of the present invention includes the combination of the holder and a mounting plate for operably attaching the holder to the golf car support post. The mounting plate comprises an elongate member dimensioned to fit in the space between the dispenser exterior surface and the sleeve interior surface when the dispenser is received in the holder. Preferably, the mounting plate abuts the vertical rib members when it is placed in the space. The mounting plate has a threaded stud that passes through a hole of the sleeve to allow operably attaching the holder to the golf car support post.

Another aspect of the present invention includes the combination of a holder and a bracket for operably attaching the holder to a support post of a golf car. The bracket comprises an elongate member having a first end adapted to mount to the sleeve exterior mounting surface and a second end adapted to mount to the golf car support post. The elongate member second end has a clamp for securing the bracket to the support post and both the elongate member second end and the clamp are shaped to conform to the support post.

In another aspect of the present invention, a bracket is provided for securing a golf accessory to a golf car. The bracket comprises a strap having a base with first and second legs extending outward from base. The strap first leg is smaller in length than the strap second leg and has an integrally formed threaded fastener that extends outward perpendicularly in a direction away from the strap second leg, which has a fastener hole on its end opposite the base. The bracket further comprises a clamp having opposite first and second ends each with a hole. One of the clamp end holes is dimensioned to receive the threaded fastener of the strap first leg and the other of the clamp end holes aligns with the strap second leg hole when the one clamp end hole receives the strap first leg threaded fastener.

Another aspect of the present invention is the provision of a kit comprising the dispenser, the holder, and a bracket for mounting the holder to the golf car support post. The bracket preferably has a channel for receiving the golf car support post that conforms to a portion of a perimeter of the support post. The bracket may also have the clamp for securing the bracket to the support post where both the bracket channel and the clamp are shaped to conform to the support post.

Additional objects, advantages and novel features of the present invention will be set forth in the description and drawings which follow below.

DESCRIPTION OF THE DRAWINGS

FIG. 1 is a perspective view of a dispenser and a holder;

FIG. 2 is a front elevational view of the dispenser of FIG. 1;

FIG. 3 is a side elevational view of the dispenser of FIG. 2;

FIG. 4 is a rear elevational view of the dispenser of FIG. 2;

FIG. 5 is a front elevational view of the holder of FIG. 1;

FIG. 6 is a side elevational view of the holder of FIG. 5;

FIG. 7 is a rear elevational view of the holder of FIG. 5;

FIG. 8 is a plan view of the holder of FIG. 6;

FIG. 9 is a front elevational view of an alternate embodiment of the dispenser of FIG. 1;

FIG. 10 is a side elevational view of the dispenser of FIG. 9;

FIG. 11 is a rear elevational view of the dispenser of FIG. 9;

FIG. 12 is a plan view of the dispenser of FIG. 10;

FIG. 13 is a bottom view of the dispenser of FIG. 10;

FIG. 14 is a front elevational view of an alternate embodiment of the holder of FIG. 1;

FIG. 15 is a side elevational view of the holder of FIG. 14;

FIG. 16 is a rear elevational view of the holder of FIG. 14;

FIG. 17 is a partial enlarged view of the detail area 17 of FIG. 16;

FIG. 18 is a plan view of the holder of FIG. 15;

FIG. 19 is a front elevational view of a mounting plate of the invention;

FIG. 20 is a side elevational view of the mounting plate of FIG. 19;

FIG. 21 is a front elevational view of a universal bracket of the invention;

FIG. 22 is a side elevational view of the universal bracket of FIG. 21;

FIG. 23 is a side elevational view of an alternate embodiment of the universal bracket of FIG. 19;

FIG. 24 is a side elevational view of an alternate embodiment of the bracket of FIG. 23;

FIG. 25 is a side elevational view of a clamp used with the brackets of FIGS. 23 and 24;

FIG. 27 is an exploded perspective view of an alternate embodiment of the kit of FIG. 26.

DESCRIPTION OF THE INVENTION

Figure 26:
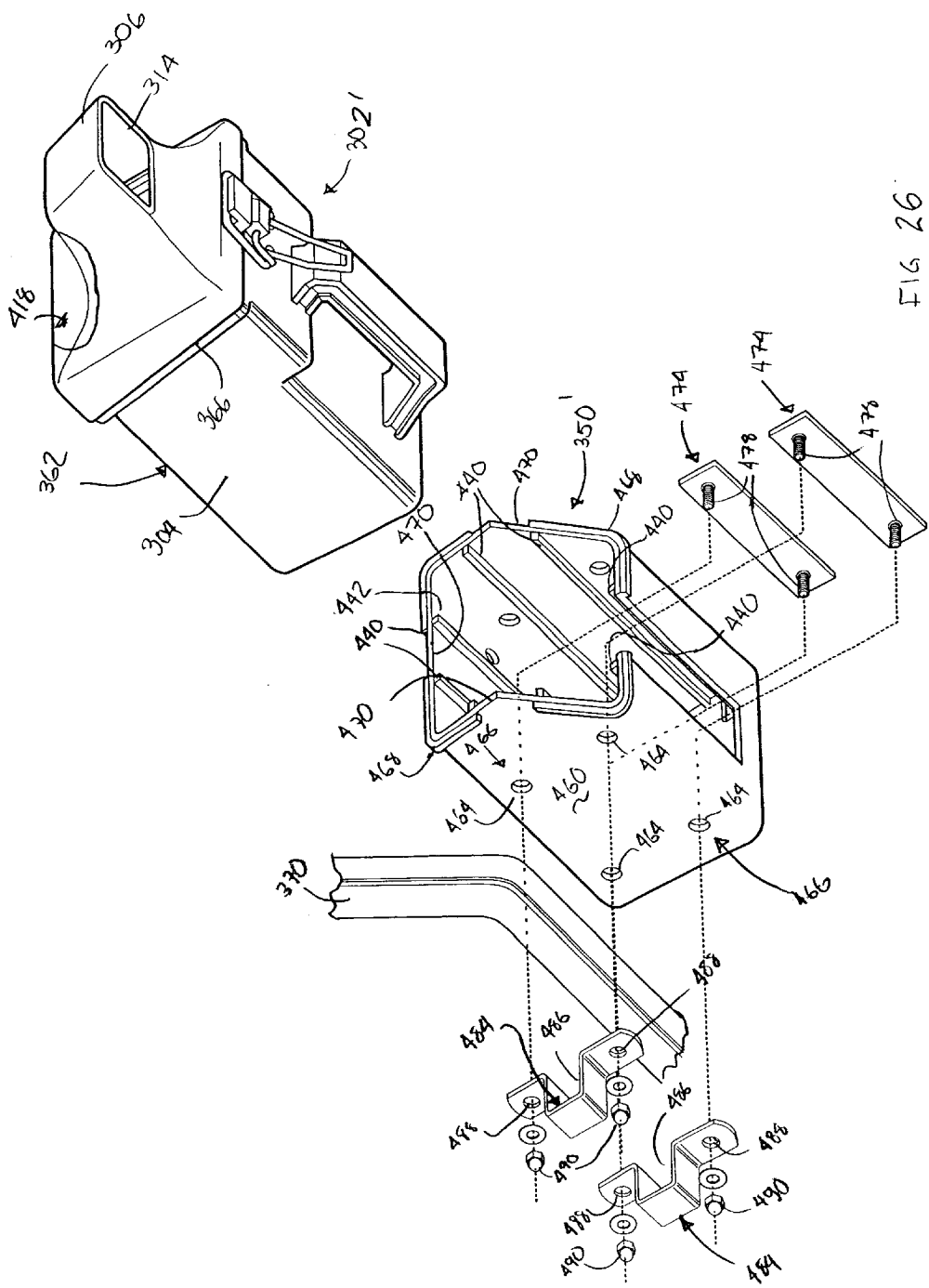
FIG. 26 is an exploded perspective view of a kit of the present invention mounting to a support post of a golf cart.

With reference to FIGS. 1–4, a dispenser 302 is shown comprising a container 304 and a spout 306 mounted on top of the container. Preferably, both the container 304 and the spout 306 are made of a resilient, rust-proof material, such as plastic or PVC. The container 304 preferably has a rectangular shape with four generally flat face panels 308 extending vertically along its length from a bottom panel 310. This arrangement allows the dispenser 302 to sit vertically upright on its bottom panel in a stored position, as well as, horizontally on one of its side panels for temporary storage.

The spout 306 is preferably tapered and formed to curve or neck away from a longitudinal centerline 312 of the container so that an opening 314 of the spout is positioned to the side of the dispenser. Preferably, the spout 306 curves away from the container 304 in a gradual manner so that the fill material can easily flow from the container into the spout and out the opening. Preferably, when the dispenser 302 is in its vertically upright or stored position, the spout 306 is angled upwardly and away from the container centerline 312 with the opening oriented vertically (FIGS. 2–3). In this way, water, for instance, from rain and/or sprinklers, is prevented from entering the spout 306 and the container 304. Preferably, the spout opening 314 is also spaced away from the container centerline 312 and oriented parallel to one of the dispenser side panels 308 so that when the dispenser 302 is laid flat on its side, the opening is above the container centerline (FIG. 1), thereby preventing fill material from spilling inadvertently from container. It should be noted that other structures on the container or cross-sectional shapes of the container may be used to accomplish the goals of providing a horizontal or flat resting surface for temporary storage of the dispenser.

As shown in FIGS. 1–3, the dispenser 302 is also provided with a handle 320 extending vertically along the length of the container. Preferably, the handle 320 is arranged on the dispenser on the same side as the spout opening 314 so that the dispenser can be rested horizontally on the side panel opposite the handle for temporary storage without spilling the fill material.

In order to permit filling the container 304, the spout 302 may be removed from the container by disengaging a lip 322 of the container from a cooperating slot 324 of the spout and releasing a latch mechanism 326 on the opposite side on the container (FIGS. 3,10). Such latch mechanisms are common in the art and may include a cam-type lock or latch where a tab 328 is pivoted to releasably engage a latch 330 around a hook 332. In place of the slot and lip, the dispenser may have another latching mechanism, or as another alternative, the dispenser may have a system of cooperating slots and tabs formed on the spout and container where prying or pressing the spout away from the container in the area of the tab and slot will disengage the container from the spout. The lip 322 may also be curved as shown in FIG. 3 to provide a pivoting connection between the spout 306 and the container 304 or the lip 322 may project out from the container a distance sufficient to in effect provide a pivoting connection as shown in FIGS. 10–12. The pivot connection provides an alternative method of filling the container and helps to align the spout when reattaching it to the container. To more firmly anchor the spout 306 to the container 304, the spout preferably has a recessed shoulder 340 formed in its interior that receives a portion of the container when the spout is attached to the container. Additionally, to ensure the spout opening 314 has the correct orientation relative to the handle 320, the spout 306 and the container 304 are preferably keyed to allow only one orientation of the spout relative to the container.

Referring to FIGS. 5–8, a holder 350 for the dispenser is shown as a sleeve 352 with an open top 354 and a closed bottom 356 with drain holes 358. An inner surface 360 of the sleeve preferably conforms to a portion of an exterior 362 of the container so as to have a neat sliding fit with the container. This allows the dispenser 302 to be slid into the sleeve through the open top 354 and rested on the sleeve bottom 356 with minimal side-to-side, front-to-back, and downward movement. Preferably, the holder 350 is provided with a vertical slot 364 that intersects with the sleeve open top and accommodates the dispenser handle 320. When the dispenser is in the holder, the handle extends sufficiently outward from the slot to enable a user to grasp the handle at the front of the holder. Preferably, the entire container 304 is received in the sleeve 352 and an outer portion 366 of the spout (FIGS. 1–4) abuts and conforms to the top 354 of the holder. The dispenser and holder may also be provided with an interlocking latching mechanism to more firmly hold the dispenser in the holder. Such an arrangement may include a system of interlocking tabs and slots or a groove and lip formed in the sleeve inner surface and container exterior.

As shown in FIGS. 6–7, the holder 350 may be provided with a pair of studs 368 that extend outward from the holder to allow attachment of the holder to a support post 370 of a golf car. The studs 368 may be directed through holes in the golf car support post to allow direct attachment of the holder to the golf car or the studs may be attached to a bracket which is in turn mounted to the golf car support post. A bracket such as that shown in FIGS. 23–25 may be used to attach the holder to a side of the golf car to provide the golf car with a neat and streamlined profile and the golfer with ready access to the dispenser. Use of the bracket of FIGS. 23–25 will be explained below.

Another embodiment of a dispenser 302' and a holder 350' is shown in FIGS. 9–18 and includes several additional features to the dispenser and holder previously described above. As shown in FIGS. 9–13, the spout 306 is provided with an upper baffle 400 in its interior in the form of a flat, generally triangular shaped member oriented in a vertical plane parallel to the dispenser longitudinal axis 312. Preferably, the upper baffle 400 is arranged opposite the spout opening 314 (FIG. 10) so that the fill material flowing from the container 304 can enter the spout without undue restriction. Preferably, the upper baffle 400 is formed monolithically with the spout 306 and centered relative to an interior 402 of the container, the spout 306 and the spout opening 314 (FIG. 12). Additionally, the container 304 is preferably provided with a lower baffle 404 in the form of a flat, generally rectangular shaped member oriented in a vertical plane parallel to the dispenser longitudinal axis 312 and centered within the container interior 402 on an interior wall (FIG. 13). Preferably, the lower baffle 404 is formed monolithically with the container and opposite the upper baffle 400 on the same side of the container as the handle 320 (FIG. 10).

Each of the upper and lower baffles 400,404 divides and disperses the fill material in the dispenser interior to prevent the fill material from settling. By providing the baffles 400,404 centered in the dispenser interior, the fill material is divided such that its cross-sectional area inside the dispenser is less than the size of an opening 406 from the container 304 into the spout 306. If the fill material does settle within the dispenser interior, the dispenser may be shaken so that the fill material in the dispenser impacts against the upper and lower baffles 400,404 where its becomes dispersed or broken apart. Repeated shaking of the dispenser allows the fill material to be broken up into smaller pieces so that it may flow from the dispenser interior into the spout and out of the dispenser through the spout opening 314.

In the dispenser interior, a moisture receiving area 410 is provided preferably at the container bottom 310 to collect any moisture that may be entrained in the fill material. Referring to FIG. 13, the container bottom 310 is preferably formed with a center recess 412 that projects into the container interior 402. The recess 412 is preferably spaced from each of the four face panels 308 of the container thereby creating a channel 414 along each of the face panels. With the dispenser placed in its vertical storage position, the fill material rests upon the raised area of the recess 412 and any moisture entrained in the fill material tends to settle toward the dispenser bottom in the channel 414. The channel tends to keep the moisture separated from the fill material as the dispenser is used while the recess 412 tends to strengthen the container 304.

On an exterior 418 of the dispenser, an indicia area 420 may be provided for the display of desired indicia 422 on the dispenser that is visible when the dispenser is being used. On many golf courses, it is often desired to display advertising, or personalized or golf course information in a discreet manner, and the exterior surface of the dispenser provides such a medium. Preferably, the indicia area 420 is located on the back of the spout away from the opening 314, where the indicia 422 is visible from the top and sides of the dispenser when the dispenser is received in the holder.

FIGS. 14–18 show an alternate embodiment of the holder 350'. The holder is provided with protrusions 440 on its inner surface 442 that engage the dispenser exterior when the dispenser is placed in the holder. Preferably, the protrusions 440 are elongated rib members that are aligned vertically in a spaced apart relationship about the sleeve inner surface 442 where they engage the container exterior 362 such that the dispenser is held in the sleeve with a space 450 between the container exterior 362 and the sleeve inner surface 442. When the dispenser 302' is placed in the holder 350', the dispenser is positioned at a distance from the sleeve inner surface 342 so that any sand or dirt material adhered to the dispenser does not interfere with the sliding fit between the dispenser and the holder. The number and positioning of the rib members maintains the sliding fit between the holder 350' and dispenser 302' to prevent any unwanted movement between the two as the golf car is operated. Preferably, multiple spaces 450 are formed between the dispenser and the holder, and the drain holes 358 in the sleeve bottom 356 are aligned in communication with the spaces 450 so that any dirt or sand that falls off the sides of the dispenser may be directed into the spaces and into the drain holes away from the holder.

As shown in FIGS. 15–16, the holder 350' is preferably formed with an exterior mounting surface 460 that enables the holder to be attached to the golf car support post in a variety of preselected positions without alteration of the holder or support. Preferably, the holder 350' is formed with a plurality of holes 464 on its exterior surface arranged in a plurality of hole patterns 466, any of which may be used to mount the holder to the support post. As the holder is generally of rectilinear cross-section, the hole patterns 466 are preferably provided on three of the four exterior surfaces, thereby allowing the holder to be positioned to the left, right, or in front of the support post. The front panel is preferably reserved for the slot 364 that accommodates the dispenser handle 320. The holder 350' is also provided with a peripheral lip 468 (FIG. 17) on its top open end 354, which rests against the spout outer portion 366 when the dispenser is placed in the holder. To allow the holder 350' to be mounted flush against the support post, the peripheral lip 468 has a notch 470, and as shown in FIGS. 15–16, the notch 470 is preferably centered relative to the mounting surface 460 between the hole patterns 466.

To provide versatility in mounting the holder to the golf car support post, a mounting plate 474 is provided (FIGS. 19–20). The mounting plate 474 comprises an elongate member 476 dimensioned to fit in the space 450 between the holder 350' and the dispenser 302' where it preferably abuts against the protrusions or rib members 440 in the sleeve inner surface 442 (FIG. 18). The elongate member 476 has threaded fasteners or studs 478 extending outward from one side so that when the mounting plate is received in the space, the threaded fasteners 478 extend through the holes 464 in the mounting surface 460 with the mounting plate 474 held in position against the rib members 440. Preferably, the mounting plate is provided with two studs to allow it to be more easily positioned and held in place in the space 450. As shown in FIG. 18, the mounting plate may be received in any number of spaces adjacent to the left and right side and rear panels of the holder.

A universal mounting bracket 484 (FIGS. 21–22) may be used to mount the holder flush against the support post. The universal mounting bracket 484 is formed with a general "U"-shaped channel 486 in its mid section with holes 488 on opposite ends of the bracket that align with the holes 464 provided on the holder mounting surface 460. Preferably, the "U"-shaped mid section 486 is dimensioned to conform to three of the four sides of the golf car support post 370 with the remaining fourth side abutted against the holder mounting surface 460 (FIG. 26).

When mounting the holder 350' flush to the support post 370 as shown in FIG. 26, two mounting plates 474 are provided in the spaces 450 adjacent the panel of the holder sleeve being used as the mounting surface 460. The studs 478 of the mounting plate are directed through the mounting surface holes 464 as the holder is abutted against the support post 462 with the support post aligned in the notch 470. The universal mounting bracket holes 488 are aligned with the mounting plate studs 478 and the holder is attached to the support post by screwing nuts 490 onto the studs to secure the holder in place. Using this same method, the holder may be attached to the support post using the mounting surface provided on any of the left and right side and rear panels. FIGS. 23–25 shows an alternate embodiment of the universal bracket 494 that allows the holder to be mounted to the support post in a spaced away arrangement from the support post (FIG. 27). The bracket 494 has a base 496 with first and second legs 498,500 extending outward from the base. The first leg 498 is shorter than the second leg 500 thereby giving the bracket a general "J"-shape with a channel 502 between the first and second legs that conforms to the support post 370. The first leg is preferably formed with a mechanical fastener 504 that extends outward perpendicularly in a direction away from the second leg. The second leg preferably has a fastener hole 506 on its distal end. The bracket 494 is also provided with a clamp 508 (FIG. 25) that conforms to the remainder of the support post perimeter when the bracket is installed on the support post. The clamp 508 has opposite first and second ends 510,512, each having a hole 514,516 where the first clamp end hole 514 receives the bracket first leg mechanical fastener 504 and the clamp second end hole 516 aligns with the bracket second leg fastener hole 506.

Referring to FIG. 27, the bracket 494' (FIG. 24) with its lengthened second leg 500' spans across the holder mounting surface 460 to engage both hole patterns 466 of the mounting surface to allow the holder to be attached to the support post 370 with more rigidity. The mounting plate 474 is positioned in each of the spaces adjacent the holder mounting surface 460 and the mounting plate studs are directed through the mounting surface holes 464, through the bracket second leg first fastener hole 506', and through the clamp second end hole 516' where they are secured with the nuts 490. The bracket second leg has a second fastener hole 518' on its distal end spaced from the first fastener hole 506' to receive the stud 478 of a second mounting plate. As an alternative, it should be noted that the bracket 494 of FIG. 23 may also be used to mount the holder to the support post in much of the same manner. In this arrangement, the holder 350' is positioned diagonally away from the support post 370 and only one mounting plate need be used in the space of the holder. Also, it should be noted that the bracket 494,494' (FIGS. 23–24) and clamp 508,508' may also be used to attach the holder 350' of FIGS. 5–7 to the support post of a golf car.

A kit including any or all of the aforementioned items may also be provided in various combinations to allow convenient mounting of the holder to the golf car. The kits may include one or more of the embodiments of the dispenser and the holder described above with any of the associated brackets and/or mounting plates.

Operation

The dispenser is prepared for use by removing the spout from the container and filling the container with the fill mixture. The tab 328 is operated to release the latch 330 from the hook 332 and the spout 306 is pivoted away from the container 304 to a position where the lip 324 may be disengaged from the slot 322 and the container may be removed from the spout. Using the handle 320, the container may used as a scoop, and once the container is filled, the spout may be reattached to the container by engaging the lip in the slot, pivoting the spout to close the container, and engaging the latch around the hook. The dispenser may then be positioned in its vertical storage position in the holder until needed by the user.

When using the dispenser, the dispenser is removed from the holder by grasping the handle 320 and sliding the dispenser upward and out through the sleeve top. The user may then carry the dispenser by the handle 320 to the location of the divot hole with the spout opening 314 facing generally vertically and/or upwardly so that the fill material does not inadvertently spill. When at the divot hole location, the user tilts the dispenser downwardly with handle facing upwardly to pour the fill material from the spout. In doing so, the spout opening faces generally away from the divot hole. By shaking the dispenser with the spout opening facing generally away from the divot hole, the fill material is metered from the dispenser into the hole in a more controlled and effective manner. When the divot hole is filled as desired, the dispenser may be returned to the holder, laid flat on its side with the spout opening facing upward for temporary storage, or rested on its bottom vertically upright for more permanent storage or to avoid rain or water.

Various changes and modifications may be made within this invention as will be apparent to those skilled in the art. Such changes and modifications are within the scope and teaching of this invention as defined in the claims appended hereto.

What is claimed is:

1. A kit comprising:
    a dispenser for holding and dispensing a fill material into a divot hole on a golf course, the dispenser comprising a container, a spout releasably attached to an end of the container, the spout having an opening offset from a centerline of the container through which the fill material flows out of the dispenser;
    a holder for releasably attaching the dispenser to a golf car, the holder comprising a sleeve having an interior surface adapted to engage with an exterior surface of the dispenser thereby restricting movement of the dispenser when the holder receives the dispenser, the sleeve having a mounting surface on its exterior surface adapted to permit mounting the holder to the support post in one of a variety of selected positions of the holder relative to the support post without alteration of the sleeve mounting surface or support post; and
    at least one bracket for mounting the holder to a support post of the golf car in releasably attaching the dispenser to the golf car, the bracket having a channel for receiving the golf car support post, the channel conforming to a portion of a perimeter of an exterior of the support post.

2. The kit of claim 1 wherein the holder has protrusions spaced about an interior surface of the holder sleeve, the protrusions engage the dispenser exterior surface in a manner to create a space between the dispenser exterior surface and the sleeve interior surface while restricting movement of the dispenser when the dispenser is slidingly received in the holder; and the kit further comprises a mounting plate comprising an elongate member dimensioned to fit in the space between the dispenser exterior surface and the sleeve interior surface when the dispenser is received in the holder, the mounting plate having a stud extending therefrom that passes through a hole of the sleeve and engages with the bracket in attaching the holder to the support of the golf car.

3. The kit of claim 2 wherein the at least one bracket comprises:
    a base with first and second legs extending outward from base, the first leg is smaller in length than the second leg and has a mechanical fastener integrally formed therewith extending outward perpendicularly therefrom in a direction away from the second leg, the second leg has a fastener hole on its end opposite the base; and
    a clamp having opposite first and second ends each with a hole, one of the clamp end holes is dimensioned to receive the threaded fastener of the first leg and the other of the clamp end holes aligns with the second leg hole when the one clamp end hole receives the first leg threaded fastener in attaching the holder to the support of the golf car.

4. The kit of claim 2 wherein the space comprises a plurality of spaces about the sleeve interior and the sleeve is provided with a plurality of holes about its exterior surface and the mounting plate fits in any one of the spaces when the dispenser is received in the holder thereby permitting the holder to be mounted to the support post in a variety of preselected positions of the holder relative to the support post without alteration of the sleeve mounting surface, the mounting plate or the support post.

5. The kit of claim 2 wherein the mounting plate abuts against at least one of the protrusions when the bracket is received in the space and the stud passes through the sleeve hole.

6. The kit of claim 1 wherein the holder mounting surface comprises a plurality of holes arranged about the sleeve exterior surface.

7. The kit of claim 6 wherein the holes are arranged in a preselected pattern to permit aligning the holder to the support post in several positions of the holder relative to the support post without alteration of the sleeve mounting surface or support post.

8. The kit of claim 7 wherein the sleeve has a generally rectilinear cross section with opposite left and right side panels spaced apart by opposite front and back panels and each of the left side, right side, and back panels is formed with at least one hole pattern.

9. The kit of claim 8 wherein the front panel has a slot extending along a longitudinal axis of the sleeve, the slot slidingly receives a handle of the dispenser.

10. The kit of claim 7 wherein the mounting surface comprises two hole patterns arranged on opposite sides of a longitudinal centerline of the mounting surface.

11. The kit of claim 7 wherein the sleeve has a lip around a peripheral edge of its open end adjacent the mounting surface and a notch is formed in the lip to accommodate the support post in mounting the holder to the support post.

12. The kit of claim 11 wherein the notch is centered relative to the mounting surface.

13. The kit of claim 1 wherein the notch is centered relative to the preselected hole patterns.

14. The kit of claim 1 wherein the sleeve is formed with a slot extending along its longitudinal axis, the slot slidingly receives a handle of the dispenser when the dispenser is slidingly received in the holder.

15. The kit of claim 14 wherein the dispenser handle extends outward through the slot beyond the holder exterior surface.

16. The kit of claim 14 wherein the dispenser handle extends from the slot in the same general direction as the dispensing spout opening.

17. The kit of claim 14 wherein the dispenser has a generally flat resting surface opposite the handle so that the container may be allowed to rest on the resting surface and yet not inadvertently dispense the fill material.

18. The kit of claim 1 wherein the holder sleeve has a closed bottom for supporting a portion of an exterior surface of the dispenser and at least one hole through the closed bottom.

19. The kit of claim 1 wherein the dispenser has an indicia area on an exterior surface of the dispenser, the indicia area having a desired indicia thereon that is visible from a top and sides of the dispenser when the dispenser is received in the holder sleeve.

20. The kit of claim 19 wherein the indicia includes golf course information.

21. The kit of claim 19 wherein the indicia includes commercial advertising.

22. The kit of claim 19 wherein the indicia includes personalized information.

23. The kit of claim 1 wherein the dispenser has a baffle in an interior of the dispenser for dispersing the fill material contained in the dispenser as the dispenser is shaken.

24. The kit of claim 23 wherein the dispenser baffle comprises an upper baffle formed in the spout opposite the opening of the dispenser.

25. The kit of claim 24 wherein the dispenser upper baffle is a planar member arranged vertically along a longitudinal axis of the dispenser.

26. The kit of claim 24 wherein claim the upper baffle is formed monolithically with the spout.

27. The kit of claim 23 wherein the dispenser baffle comprises a lower baffle formed on an interior wall of the container.

28. The kit of claim 27 wherein the dispenser lower baffle is a planar member arranged vertically along a longitudinal axis of the dispenser.

29. The kit of claim 27 wherein the lower baffle is arranged on the interior wall of the container on the same side as the spout opening.

30. The kit of claim wherein the claim 27 lower baffle is formed monolithically with the container.

31. The kit of claim 1 wherein the dispenser further comprises a latch and a hinge for releasably attaching the spout to the container.

32. The kit of claim 31 wherein the hinge and latch are disposed about the container periphery generally opposite to each other and the hinge is a detachable hinge, thereby allowing the spout to detach from the container as the spout is rotated to an extreme opening position.

33. The kit of claim 32 wherein the hinge is formed by slot on one of the spout and the container and a cooperating tab on the other of the spout and the container and the tab extends outward a distance sufficient to allow the spout to be pivoted relative to the container with the tab received in the slot.

\* \* \* \* \*